July 21, 1959     J. A. TOTTEN     2,895,402

COFFEE BREWING APPARATUS

Filed Aug. 26, 1957     3 Sheets-Sheet 1

INVENTOR:
John A. Totten,
BY Dawson, Tilton, Fallon & Lungmus,
ATTORNEYS.

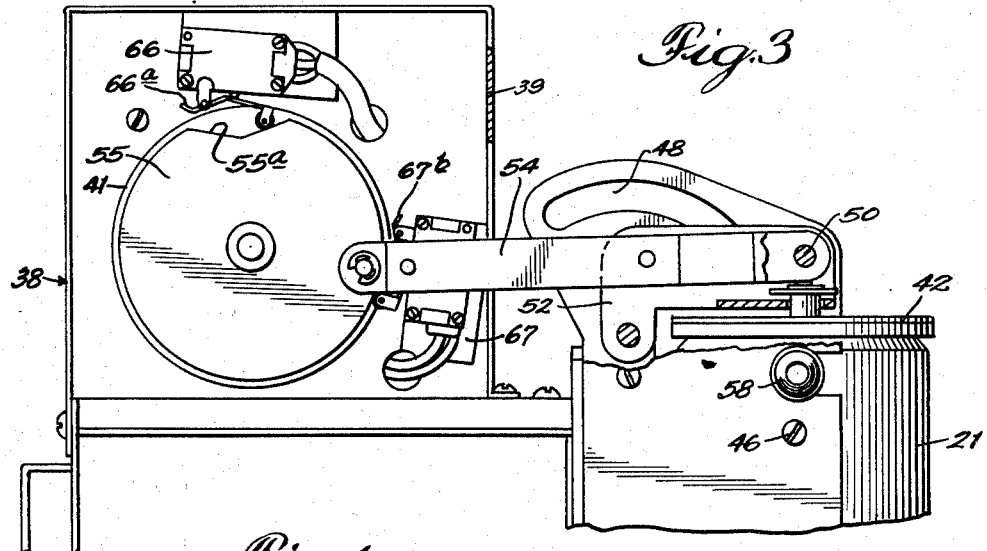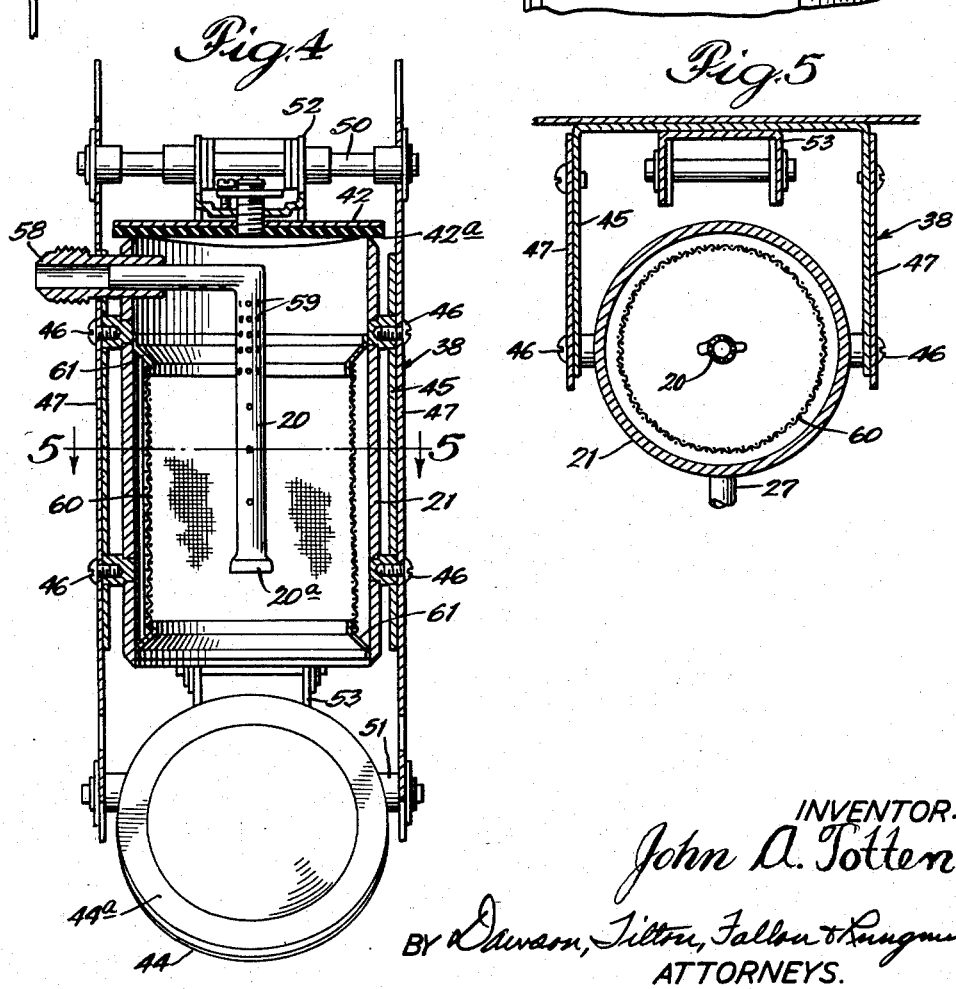

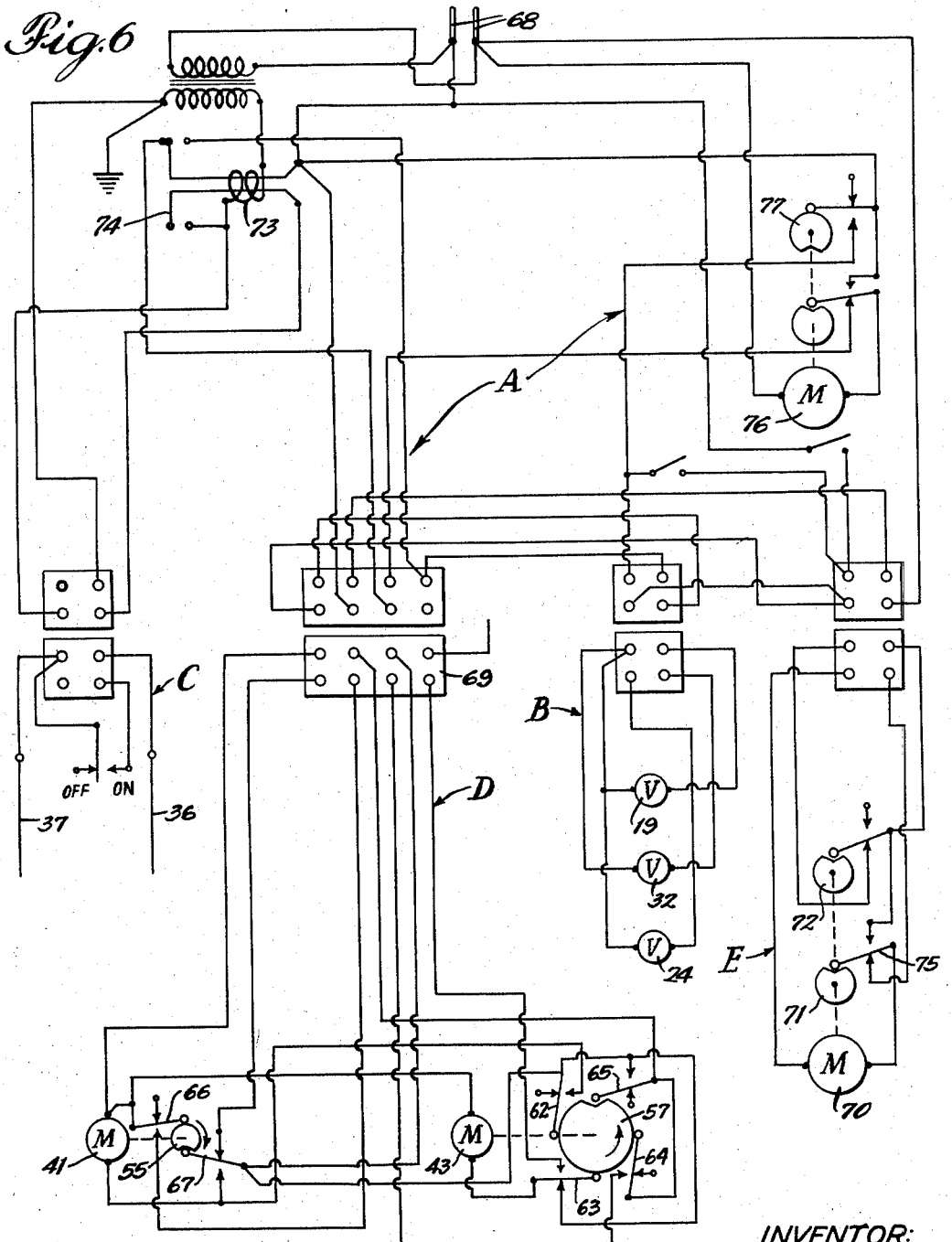

United States Patent Office 2,895,402
Patented July 21, 1959

2,895,402

COFFEE BREWING APPARATUS

John A. Totten, Hammond, Ind., assignor to Industrial Vendors, Inc., Hammond, Ind., a corporation of Indiana Application August 26, 1957, Serial No. 680,184

5 Claims. (Cl. 99—289)

This invention relates to a coffee brewing apparatus, and, more particularly, to coffee brewing apparatus incorporated in an automatic coffee vending machine.

Since World War II, the "coffee break" has become increasingly popular. To meet the demand for coffee, automatic vending machines have been provided which have been found especially desirable in those locations where no restaurant or individual brewing apparatus is available. In the main, however, these vending machines have not satisfied the demand because they have been incapable of providing coffee of a uniform, high quality. It is to be appreciated that these machines encounter peak loads. In an industrial plant, for example, the mid-morning or mid-afternoon coffee break requires the machine to produce a large number of cups of coffee in a relatively short period. The same condition exists, of course, whenever a mealtime occurs. The problem, therefore, facing those in this field is to provide a machine that produces coffee of a uniform, high character, quickly and at low cost. Failure or even inadequacy in any one of these respects is enough to bring the particular machine into disfavor with its prospective customers.

One of the most frequently encountered problems in this connection is the avoiding of too strong coffee at the beginning of a dispensing cycle, and too weak a coffee at the end thereof. However, even when this is solved, there is the further problem of providing uniform coffee from cycle to cycle. In order to avoid these difficulties, those operating the machines turned, for a time, to the use of instant coffee. This, however, appears to also have been unsatisfactory, and there is a distinct trend toward returning to the use of brewed coffee. For the above mentioned uniformity in coffee strength, taste, flavor, odor, etc., it is essential that uniform conditions of coffee brewing prevail. One such condition relates to the character of the ground coffee itself, but this is a matter not regulatable by the vending machine. Where uniform ground coffee is available, for a uniform brewed coffee it is necessary that the time of exposure of the ground coffee to hot water and the quantity and quality of hot water be constant.

The achievement of the desired uniform conditions of brewing has proven nearly impossible when a pressurized water circulation system is employed. In most vending machines, the pressure of the water determines the quantity used for brewing. Where the water pressure employed was that derived from the water system mains of the municipality wherein the machine was located, a wide variation of water pressure was encountered. The pressure was found to vary over as great a range as from practically no pressure up to as high as 50 p.s.i. This undesirable variation was attempted to be solved by the introduction of pressure-regulating devices. However, the introduction of additional elements in a machine of this type compounds the possibility of its failure to operate properly. Further, it is more expensive not only to install but to service. Still further, and of extreme importance, is the psychological effect upon the prospective customer of the inoperation of a vending machine. Where a prospective customer has either obtained no coffee or poor coffee from an automatic coffee vending machine, it is exceedingly difficult to convince him to try the machine again.

The alternative to a pressure system, even one regulated by special equipment, was a gravity system. However, those in this field apparently felt that a gravity system in a coffee vending machine was not the answer because it operates too slowly. The very nature of the demand on a coffee vending machine requires a rapid operating cycle.

Contrary to expectation, however, I am able to provide the desired coffee product, quickly, and at low cost, through a novel system employing gravity as the means by which water is circulated in a coffee vending machine.

It is an object of this invention to provide a coffee brewing apparatus that is adapted to be employed in an automatic coffee vending machine which overcomes the disadvantages and problems outlined above. Another object is to provide a novel coffee brewing apparatus employing gravity flow. Other objects and advantages of this invention can be seen as this specification proceeds.

This invention will be explained, in an illustrative embodiment, in conjunction with the accompanying drawing, in which—

Fig. 1 is an elevational schematic view of a portion of an automatic coffee vending machine; Fig. 2 is an enlarged elevational view of the coffee brewing apparatus represented schematically in Fig. 1; Fig. 3 is a fragmentary elevational view of the coffee brewing apparatus shown in Fig. 2 but with the view in Fig. 3 taken from the side opposite that in Fig. 2; Fig. 4 is a sectional view taken along the line 4—4 of Fig. 2; Fig. 5 is a cross-sectional view taken along the line 5—5 of Fig. 4; and Fig. 6 is a schematic diagram of the control circuit used in a coffee vending machine embodying teachings of my invention.

In the illustration given, the numeral 10 in Fig. 1 designates a schematic representation of a housing or casing for apparatus adapted to dispense brewed coffee in cup form. Since this invention is primarily concerned with the coffee-brewing apparatus portion of such a machine, certain elements have been omitted from the schematic representation, such as those relating to the turret means for storing cups, the cup dispenser, the coin-receiving mechanism, etc. For these elements, conventionally-employed devices can be utilized satisfactorily in the practice of this invention.

In Fig. 1, the numeral 11 designates a water supply tank communicating with an outside source of water, such as the city main, through a conduit designated 12, and which is equipped with a valve 13 actuated by a float control 14. Tank 11 is under atmospheric pressure, as can be achieved by leaving a portion of the top thereof exposed to outside air.

Also positioned in casing 10 and below water supply tank 11 is a hot water tank 15, which is communicated with the bottom of water supply tank 11 through conduit 16. Also communicating with hot water tank 15 through the top thereof is standpipe 17, which establishes atmospheric pressure within hot water tank 15. The water within hot water tank 15 is maintained in a heated condition through heater 18, shown in schematic form. A second conduit 19 leads from the top of hot water tank 15 and terminates as at 20 in brewing chamber 21. The flow through conduit 19 is regulated through valve 22. The portion of conduit 19 designated 20 can also be supplied with unheated water from water supply tank 11 through conduit 23, which is valved as at 24.

Positioned above brewing chamber 21 is a hopper 25 for ground coffee, and positioned below brewing chamber 21 is a waste container 26, which is adapted to receive spent coffee grounds.

A conduit 27 extends from the bottom of coffee-brewing chamber 21 and rises upwardly to deliver brewed coffee into a coffee reservoir designated 28. Coffee reservoir 28 is provided with an insulated housing as at 29 and with two compartments, designated 30 and 31. In the illustration given, compartment 30 is positioned above compartment 31 and receives brewed coffee as it issues from brewing chamber 21. After a quantity of coffee has been brewed and flowed by gravity to compartment 30, valve 32 in conduit line 33 communicating the two compartments is opened so that the brewed coffee may be transferred to compartment 31. Coffee is dispensed from compartment 31 through conduit 34 which includes a coin-operated valve 35.

With the gravity flow system shown in Fig. 1, I am able to brew from 10 to 12 cups of coffee in from 2 to 3 minutes. The first coffee issuing from coffee-brewing chamber 21 and entering compartment 30 is quite strong, while the last coffee issuing from the chamber in the brewing cycle is quite weak. Thus, the use of compartment 30 prevents the inadvertent discharge through conduit 34 of excessively strong coffee as might occur where a cup of coffee is required just at the commencement of the brewing cycle. The use of plural compartments, therefore, insures the dispensing of coffee of uniform strength. Shown in compartment 30 are electrodes 36 and 37, which provide the signals necessary to initiate and stop the coffee-brewing cycle depending upon the level of coffee in compartment 30. It is to be appreciated that the coffee level, except under extreme requirements, will ordinarily lie within the confines of compartment 30 which, as well as compartment 31, is considerably larger than the volume of coffee produced during a single brewing cycle. Excellent results have been obtained in a system of the character described wherein the coffee flow within the system is due to gravity only and the maximum difference between the level of brewed coffee in compartment 30 and the level of water in tank 11 is less than about 12 inches.

In a typical operation of the apparatus previously described, the brewing cycle is initiated by a signal from electrode 36, indicating the presence of insufficient coffee in reservoir 28. This signal opens valve 19, which flushes hot water through brewing chamber 21 to preheat the same and scavenge any spent grounds from a previous cycle, the flushing water being discharged into the waste receptacle 26. As will be hereinafter described, brewing chamber 21 is provided with openable end closures. After the brewing chamber 21 has been flushed and preheated, valve 19 is closed as well as is the bottom closure of brewing chamber 21. The top closure remains open so as to permit discharge of a metered quantity of fresh ground coffee into chamber 21 from coffee hopper 25. When the metered quantity of coffee has been discharged into brewing chamber 21, the top closure of brewing chamber 21 is closed and valve 19 again opened, whereby hot water circulates through the coffee grounds in brewing chamber 21 and thence to coffee reservoir 28. As pointed out above, during this cycle, valve 32 is closed, restricting the receipt of freshly-brewed coffee to compartment 30. When a predetermined quantity of hot water has been flowed through brewing chamber 21, electrode 37 provides a signal indicating the end of the brewing cycle which opens the bottom closure of brewing chamber 21, discharging the spent coffee grounds into waste receptacle 26. Thereafter, valve 24 in the conduit 23 leading from the water supply tank 11 is opened so as to provide flushing of any retained spent grounds from brewing chamber 21 into waste receptacle 26.

Referring now to Figs. 2-5 of the drawing, the brewing chamber portion of my invention can be seen in greater detail along the controls provided for achieving the sequence of operations described above.

In Figs. 2-5, the numeral 21 again designates a brewing chamber and the numeral 27 designates a conduit leading from the brewing chamber 21 to the brewed coffee reservoir 28. The brewing chamber 21 in these views is shown in an inoperative condition, i.e., a condition prior to energization of electrode 36 to initiate the brewing cycle. In the illustration given, the brewing chamber 21 is of tubular or cylindrical construction, as can be seen from the cross-sectional view shown in Fig. 5. Excellent results are obtained when the cylindrical brewing chamber 21 is constructed of stainless steel. Rigidly secured to brewing chamber 21 and supporting it within casing 10 is a frame generally designated 38. In Fig. 2, frame 28 is seen to include a pair of box-like structures mounted one above the other and designated 39 and 40. The upper box-like structure portion 39 of frame 38 houses a motor 41 (seen in Fig. 3), which operates the top closure 42 of brewing chamber 21. The lower box-like structure portion 39 of frame 38 supports a second motor 43 which operates the lower closure 44 of brewing chamber 21. Secured to frame 38 is a U-shaped supporting element 45, in which brewing chamber 21 is securely mounted as by bolts 46 which are threadedly received in the side wall of brewing chamber 21. External of each of the laterally-extending arms of U-shaped supporting element 45 are closure support plates 47. In Fig. 2, for example, one such plate 47 can be seen in full elevational view, and is seen to include a pair of arcuate slots 48 and 49 positioned in the top and bottom portions, respectively. A corresponding plate 47 is provided on the other side of U-shaped supporting element 45, as can be appreciated from a consideration of Figs. 4 and 5.

Movably positioned within arcuate slots 48 and 49 are shafts 50 and 51 associated with the top and bottom closures 42 and 44, respectively. Top closure 42 is pivotally mounted on brewing chamber 21 by arm 52, while the lower closure 44 is similarly pivotally mounted on brewing chamber 21 by arm 53. The upper shaft 50 is received within openings in arm 52 so that when arm 52 is pivoted upwardly to open upper closure 42, shaft 50 rides within arcuate slot 48. The motivation for opening upper closure 42 is provided by a linkage 54 which at one end is secured to shaft 50 and at the other end is eccentrically connected to motor 41 through motor cam 55. A similar arrangement is provided for the bottom closure 44, wherein a lower linkage 56 is pivotally secured to shaft 51 and to motor cam 57 which is part of the lower motor 43. The linkage and cam arrangement is so constructed that one revolution of the associated motor will move the associated closure from an open position to a closed position and back to an open position.

As seen in Fig. 4, brewing chamber 21 is provided with a water inlet adjacent the top thereof which is designated 58. Inlet 58 communicates with conduits 19 and 23 to selectively receive water from either tank 11 or tank 15, depending upon the operation called for. Inlet 58 terminates as at 20 in a perforated pipe extending axially of the cylindrical brewing chamber 21, as illustrated. The end of the pipe is closed as at 20a, requiring all liquid entering inlet 58 to exit through openings 59. Supported within brewing chamber 21 is a foraminous element or screen 60 through which all water entering inlet 58 must flow in order to exit through conduit 27— this condition occurring only when both top and bottom closures 42 and 44, respectively, are closed. Screen 60 is supported at the top and bottom ends thereof and spaced inwardly from the inside wall of brewing chamber 21 by annular rings 61 (best seen in Fig. 4). Rings 61 are solid so that no water can pass through them, and closures 42 and 44 are provided with gaskets 42a and 44a, respectively, so that a sealed brewing chamber is provided wherein brewing liquid passes radially through the grounds and through screen 60. In this manner, I have substantially avoided the problem of "channeling"

which frequently occurs when brewing water is directed vertically through ground coffee.

Referring again to Fig. 2, and in particular the lower box-like structure 40, it is seen that there is supported therein four switches and which are designated by the numerals 62–65. Each switch is provided with a pivotally-mounted arm designated 62a, 63a, 64a, and 65a, respectively. Each pivotal arm carries a cam follower which follows the periphery of motor cam 57 and which produces a change in the condition of the associated switch when the cam follower enters the cam slot 57a. Switch 62 is employed to start the top motor 41. Switch 63 is employed to stop the bottom motor 43 with the bottom closure 44 in the closed position. Switch 64 actuates valve 24 to flush brewing chamber 21, and switch 65 is employed to stop further operation of a brewing cycle. Between the operation of switches 63 and 64, the brewing operation is performed and is under the control of the level of the coffee in compartment 30.

Referring now to Fig. 3, it will be seen that the upper box-like structure 39 which supports motor 41 also supports a pair of switches designated 66 and 67. As is the case with the switches associated with the lower motor 43, each switch is provided with a pivotally mounted arm 66a and 66b, respectively, which arms in turn carry cam followers which follow the periphery of upper motor cam 55. Switches 66 and 67 are changed in condition when their associated cam followers enter recess 55a of cam 55.

As pointed out before, the top motor is energized after the start of the bottom motor. The top motor 41 continues to run until cam 55 activates switch 67. Switch 67 energizes a motor (not shown) associated with coffee hopper 25. The coffee hopper motor has two cams attached to it, one of which activates a kill switch, stopping all action on the brew chamber (top motor stops with upper closure 42 wide open, and valve 19 is deenergized) until the coffee hopper motor completes its entire cycle of dropping a measured portion of coffee into brew chamber 21. When the coffee hopper motor completes its cycle, the valve 19 will again be energized, as will top motor 41, to complete its cycle of closing top closure 42. When the top closure 42 is closed, cam 55 is in such a position as to activate switch 66 which stops further rotation of top motor 41.

The circuitry employed for the operation of brewing coffee is seen in Fig. 6. The upper half of the wiring diagram seen in Fig. 6 is generally designated by the letter A and can be considered the power circuit. 110 volts A.C. is impressed across the terminals designated 68 at the extreme upper portion of Fig. 6. The central lower portion of the lower wiring diagram is designated generally by the letter B, and is connected to the power circuit A by means of connector 69, also seen in the lower right-hand portion of Fig. 2. Stemming from connector 69 are various leads which are employed to interconnect motors 41 and 43 and their associated switches which are represented diagrammatically. A second sub-circuit is seen in Fig. 6 at the extreme left-hand side thereof and is designated by the letter C, which includes electrodes 36 and 37 operative to initiate and stop the brewing cycle. A third sub-circuit, designated D, is seen in the central lower right-hand portion of Fig. 6 which is the valve-actuating circuit and which includes valves 19, 32, and 24. Yet another sub-circuit is seen in Fig. 6, this designated by the letter E, and which relates to the coffee hopper. The numeral 70 designates the coffee hopper motor referred to above, and the numerals 71 and 72 designate the two cams associated with coffee hopper motor 70.

Also seen in Fig. 6 at the upper left-hand portion thereof is a relay 73 having movable contacts 74 which are actuated by the electrodes 36 and 37 in circuit C to initiate the brewing cycle and therefore power the remaining sub-circuits B, D and E.

It is believed that a further brief explanation of the operation of the above-described elements and circuitry will be helpful in the further understanding of this invention. Therefore, such a description follows:

*Operation*

In the normal off-cycle of the brew chamber 21, the bottom closure 44 is open and the top closure 42 is closed. When the liquid level control relay 73 is de-energized by a predetermined drop in the level of brewed coffee in reservoir tank 29, as indicated by a signal from electrode 36, the right-hand, normally closed contacts 74 of relay 73 energize the bottom motor 43, causing it to rotate. The contacts also energize brew valve 19, which initiates the flow of hot water (temperature of about 205° F.) so as to flush and reheat brewing chamber 21. The flushing also removes any spent grounds from the inner face of bottom closure 44 which might otherwise impair the seal between bottom closure 44 and brewing chamber 21. As bottom motor 43 starts to close bottom closure 44 of brew chamber 21, cam 57 revolves to activate switch 62. Switch 62 activates top motor 41. The bottom motor 43 continues to run until it activates switch 63. Switch 63 stops bottom motor 43 with bottom closure 44 in the closed position. Top motor 41 continues to run and its cam 55 activates the coffee hopper switch 67. Coffee hopper motor 70 is activated by switch 67. As pointed out above, coffee hopper motor 70 has cams 71 and 72 attached to it, cam 71 activating a switch 75 which removes all power from the brew chamber circuit (the top motor is stopped with the top closure wide open, the brew valve is temporarily deenergized). After the coffee hopper completes its cycle of dropping a measured portion of coffee into brew chamber 21, brew valve 19 is again energized and top motor 41 starts to complete its cycle of closing top lid 42. The top motor 41 is stopped by the action of switch 66 when the top closure 42 is tightly closed.

After brew valve 19 has allowed enough water to pass from tank 15 through the ground coffee and into reservoir tank 28, raising the level sufficiently to energize electrode 37, the liquid level control relay 73 will again be energized. When relay 73 closes, brew valve 19 is deenergized and bottom motor 43 is activated, opening lower closure 44 to allow the used coffee grounds to drop out. During the opening of bottom closure 44, cam 57 activates flush switch 64 which in turn energizes timer motor 76 which is provided with a cam 77. Cam 77 energizes valve 24 to flush the remaining coffee grounds out of brewing chamber 21 and screen 60. Bottom motor 43 continues to rotate until cam 57 activates the cycle off switch 65.

While, in the foregoing specification, I have set forth a specific structure in considerable detail for the purpose of illustrating an embodiment of this invention, it will be understood that such details may be varied widely by those skilled in the art without departing from the spirit of my invention.

I claim:

1. In coffee brewing apparatus, a housing supporting a water storage tank adjacent the top thereof, water supply means for said tank, a brewing chamber mounted in said housing below said tank, a conduit connecting said tank and chamber whereby water from said tank flows by gravity into said chamber, means in said conduit for heating water flowing therethrough, a valve in said conduit, said chamber comprising a generally tubular element equipped with openable end closures at the top and bottom thereof, a coffee hopper supported in said housing above said chamber and vertically aligned therewith, means in said housing for opening the top end closure and for introducing coffee into said chamber from said hopper, a screen in said element spaced inwardly of the side wall thereof and defining a closed-ended annular space communicating with the interior of said element only through said screen, said conduit extending into the said interior of said element, an outlet conduit for said chamber connected with said space and brewed coffee reservoir means, and means in said housing for opening and closing the bottom end closure of said chamber, the last-mentioned means being operative to open said valve temporarily just prior to the closing of said bottom end closure to additionally flush and preheat said chamber.

2. The structure of claim 1 in which said water heating means comprises a second tank mounted in said housing and spaced below the first-mentioned tank, said second tank being interconnected into said conduit between said first-mentioned tank and said valve and a by-pass line about said second tank and said valve connecting said chamber with said first-mentioned tank, and valve means in said by-pass line, said valve means being actuated to open position by said last-mentioned means only when said valve is closed and said bottom end closure is open.

3. The structure of claim 1 in which said last-mentioned means includes motor means mounted in said housing, said motor means being equipped with a rotatable cam, said cam being engageable at two positions thereof with switch means in said housing for opening said valve.

4. For an automatic coffee vending machine, a self-contained brewing unit supported in said machine and comprising a water storage tank, means for supplying water to said tank to continuously maintain the level thereof above the rest of said unit, a brewing chamber positioned below said tank, flow conduit means connecting said tank and chamber and equipped with means for heating water in said conduit, said brewing chamber being equipped with openable top and bottom closures, a coffee supply hopper positioned directly above said chamber, means for opening said top closure and activating said hopper to introduce coffee into said chamber by gravity, a waste receptacle positioned below said chamber to receive waste products therefrom by gravity, a reservoir tank positioned above said chamber and below the level of water in said tank, a flow conduit connecting said chamber and reservoir, a screen in said chamber interposed between the connection of said flow conduit and the connection of said flow conduit means, a dispensing conduit leading from said reservoir to deliver brewed coffee to a point external of said machine, said flow conduit means comprising a pair of flow passages each equipped with a valve, only one of said passages being equipped with heating means, means on said chamber for opening and closing the bottom closure and for opening the valve in the passage equipped with heating means, said valve opening means being operative to open said valve just prior to the closing of said bottom closure and thereafter to reopen said valve after the bottom closure has been closed and said chamber has been charged with coffee from said hopper, said valve opening means being operative to open the valve in the other passage only when said bottom closure is open.

5. For an automatic coffee vending machine, a self-contained brewing unit comprising a frame supporting a vertically-disposed tubular brewing chamber, means for introducing heated and unheated water axially of said chamber, port means in the wall of said chamber communicating said chamber with a brewed coffee reservoir, a foraminous member mounted in said chamber and spaced inwardly of the side wall thereof and defining a closed-ended annular space communicating with the interior of said chamber only through said foraminous member, a coffee hopper positioned above said chamber adapted to drop coffee thereinto, a waste receptacle below said chamber adapted to receive waste products by gravity from said chamber, said chamber being equipped with pivotally-openable end closures, electric motors on said frame for opening said end closures, and electromechanical means on said frame for sequentially flushing the said chamber with heating water when the bottom closure is open, closing the said bottom closure, opening the top closure to introduce coffee into said chamber from said hopper, and closing the said top closure, introducing a predetermined amount of heated water into said chamber, opening said bottom closure, and introducing unheated water into said chamber.

References Cited in the file of this patent
UNITED STATES PATENTS

| | | |
|---|---|---|
| 222,402 | Hawley | Dec. 9, 1879 |
| 230,523 | Bazin | July 27, 1880 |
| 1,662,547 | Urtis | Mar. 13, 1928 |
| 1,709,290 | Torriani | Apr. 16, 1929 |
| 1,736,460 | Pistoni et al. | Nov. 19, 1929 |
| 2,012,645 | Thomas | Aug. 27, 1935 |
| 2,014,325 | Grilli | Sept. 10, 1935 |
| 2,366,384 | Cavicchioli | Jan. 2, 1945 |
| 2,407,482 | Doyle | Sept. 10, 1946 |
| 2,447,692 | Evensen | Aug. 24, 1948 |
| 2,493,932 | Swanson | Jan. 10, 1950 |
| 2,517,236 | Plummer | Aug. 1, 1950 |
| 2,613,588 | Swanson | Oct. 14, 1952 |
| 2,639,078 | Karlen | May 19, 1953 |
| 2,702,000 | Renner | Feb. 15, 1955 |
| 2,718,843 | Jones | Sept. 27, 1955 |
| 2,730,034 | Svendsgaard | Jan. 10, 1956 |
| 2,750,871 | Landgraber et al. | June 19, 1956 |
| 2,761,200 | Arnett | Sept. 4, 1956 |
| 2,827,845 | Richeson | Mar. 25, 1958 |

FOREIGN PATENTS

| | | |
|---|---|---|
| 28,525 | France | Nov. 26, 1924 |